United States Patent
Farré Guiu et al.

(10) Patent No.: US 11,494,944 B2
(45) Date of Patent: Nov. 8, 2022

(54) AUTOMATIC LOW CONTRAST DETECTION

(71) Applicant: Disney Enterprises, Inc., Burbank, CA (US)

(72) Inventors: Miquel Angel Farré Guiu, Bern (CH); Marc Junyent Martin, Barcelona (ES); Pablo Pernias, Alicante (ES)

(73) Assignee: Disney Enterprises, Inc., Burbank, CA (US)

(*) Notice: Subject to any disclaimer, the term of this patent is extended or adjusted under 35 U.S.C. 154(b) by 44 days.

(21) Appl. No.: 16/951,520

(22) Filed: Nov. 18, 2020

(65) Prior Publication Data
US 2022/0156978 A1    May 19, 2022

(51) Int. Cl.
| | |
|---|---|
| *G06T 7/90* | (2017.01) |
| *G06V 10/44* | (2022.01) |
| *G06V 10/56* | (2022.01) |
| *G06V 10/75* | (2022.01) |

(52) U.S. Cl.
CPC .............. *G06T 7/90* (2017.01); *G06V 10/44* (2022.01); *G06V 10/56* (2022.01); *G06V 10/751* (2022.01); *G06T 2207/10024* (2013.01); *G06T 2207/20036* (2013.01)

(58) Field of Classification Search
CPC ............ G06T 7/90; G06T 2207/10024; G06T 2207/20036; G06V 10/44; G06V 10/56; G06V 10/751
USPC ......................................................... 382/165
See application file for complete search history.

(56) References Cited

U.S. PATENT DOCUMENTS

| | | | |
|---|---|---|---|
| 5,715,325 A | 2/1998 | Bang et al. | |
| 6,671,395 B1 | 12/2003 | Ott et al. | |
| 7,953,295 B2 | 5/2011 | Vincent et al. | |
| 8,144,979 B2 | 3/2012 | Kuo | |
| 8,218,831 B2 | 7/2012 | Tian et al. | |
| 8,265,349 B2 | 9/2012 | Wang et al. | |
| 8,311,329 B2 | 11/2012 | Meyer et al. | |
| 8,320,674 B2 | 11/2012 | Guillou et al. | |
| 8,526,732 B2 | 9/2013 | Galic et al. | |
| 8,626,236 B2 | 1/2014 | Lindner et al. | |
| 8,839,326 B2 | 9/2014 | Umeroglu et al. | |
| 8,917,275 B2 | 12/2014 | Grieves et al. | |
| 9,317,764 B2 | 4/2016 | Baheti et al. | |
| 9,412,030 B2 | 8/2016 | Bocharov et al. | |
| 9,465,774 B2 | 10/2016 | Maison | |

(Continued)

OTHER PUBLICATIONS

U. Garain, et al., "On Foreground-Background Separation in Low Quality Document Images", International Journal of Document Analysis and Recognition (IJDAR), Feb. 10, 2006, 19 pages.

*Primary Examiner* — Ali Bayat
(74) *Attorney, Agent, or Firm* — Patterson + Sheridan, LLP

(57) ABSTRACT

A method includes generating a delicate area map by performing a morphological function on a portion of a received first image and identifying a plurality of edges in the first image, the plurality of edges comprising a plurality of pixels. The method also includes verifying a first contrast metric for a first subset of pixels that are in the plurality of pixels but not in the delicate area map, verifying a second contrast metric for a second subset of pixels that are in the plurality of pixels and in the delicate area map, and generating a validation result based on the verifying of the first contrast metric and the verifying of the second contrast metric.

20 Claims, 5 Drawing Sheets

(56) References Cited

U.S. PATENT DOCUMENTS

| | | |
|---|---|---|
| 9,569,855 B2 | 2/2017 | Kim |
| 9,576,272 B2 | 2/2017 | Macciola et al. |
| 9,792,675 B1 | 10/2017 | Lina et al. |
| 10,354,122 B1 | 7/2019 | He et al. |
| 10,460,196 B2 | 10/2019 | Dhawan et al. |
| 10,691,984 B2 | 6/2020 | Loginov et al. |
| 2002/0159636 A1 | 10/2002 | Lienhart et al. |
| 2007/0285537 A1* | 12/2007 | Dwinell .................. G06T 7/001 348/263 |
| 2015/0358542 A1* | 12/2015 | Sato ................... H04N 5/23232 348/239 |
| 2016/0104055 A1* | 4/2016 | Lin .......................... G06T 3/40 382/298 |
| 2019/0156487 A1* | 5/2019 | Liston ....................... G06T 7/11 |
| 2019/0244327 A1* | 8/2019 | Lin ......................... G06T 11/60 |
| 2020/0143204 A1 | 5/2020 | Nakano et al. |

\* cited by examiner

AUTOMATIC LOW CONTRAST DETECTION

BACKGROUND

Images contain pixels that may have high or low contrast. Low contrast pixels have a color that is similar to the colors of its surrounding pixels, and high contrast pixels have a color that is different from the colors of its surrounding pixels. It may be difficult for the human eye to differentiate a low contrast pixel from its surrounding pixels. On the other hand, it is relatively easy for the human eye to differentiate a high contrast pixel from its surrounding pixels. Therefore, when the creator of an image wants an object in the image to stand out and be easily detectable by the human eye, the creator will want that object to have a high contrast with its surroundings.

Conventional methods of detecting contrast are subjective and rely on human judgment or expertise. As a result, these conventional methods may produce inconsistent results. For example, one reviewer may determine that a region of an image has low contrast while another reviewer may determine that that same region has high contrast. Additionally, these conventional methods are subject to human error and their results may vary depending on the media on which the image is displayed (e.g., mobile phone display vs office projector). For example, a reviewer who is identifying regions of low contrast may miss or not see a low contrast region due to its small size.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

This disclosure describes processes for automatically detecting low contrast regions in an image. Generally, the processes involve processing component images (e.g., a background image and a title image) to detect edges of objects in those component images. The contrast of the pixels in those edges relative to surrounding pixels in the component images is then evaluated to determine whether there is sufficient contrast at the boundaries of the objects. In some embodiments, the processes automatically adjust regions of low contrast to increase the contrast in those regions. In this manner, the low contrast regions in an image are identified and remedied as appropriate.

Figure 1:
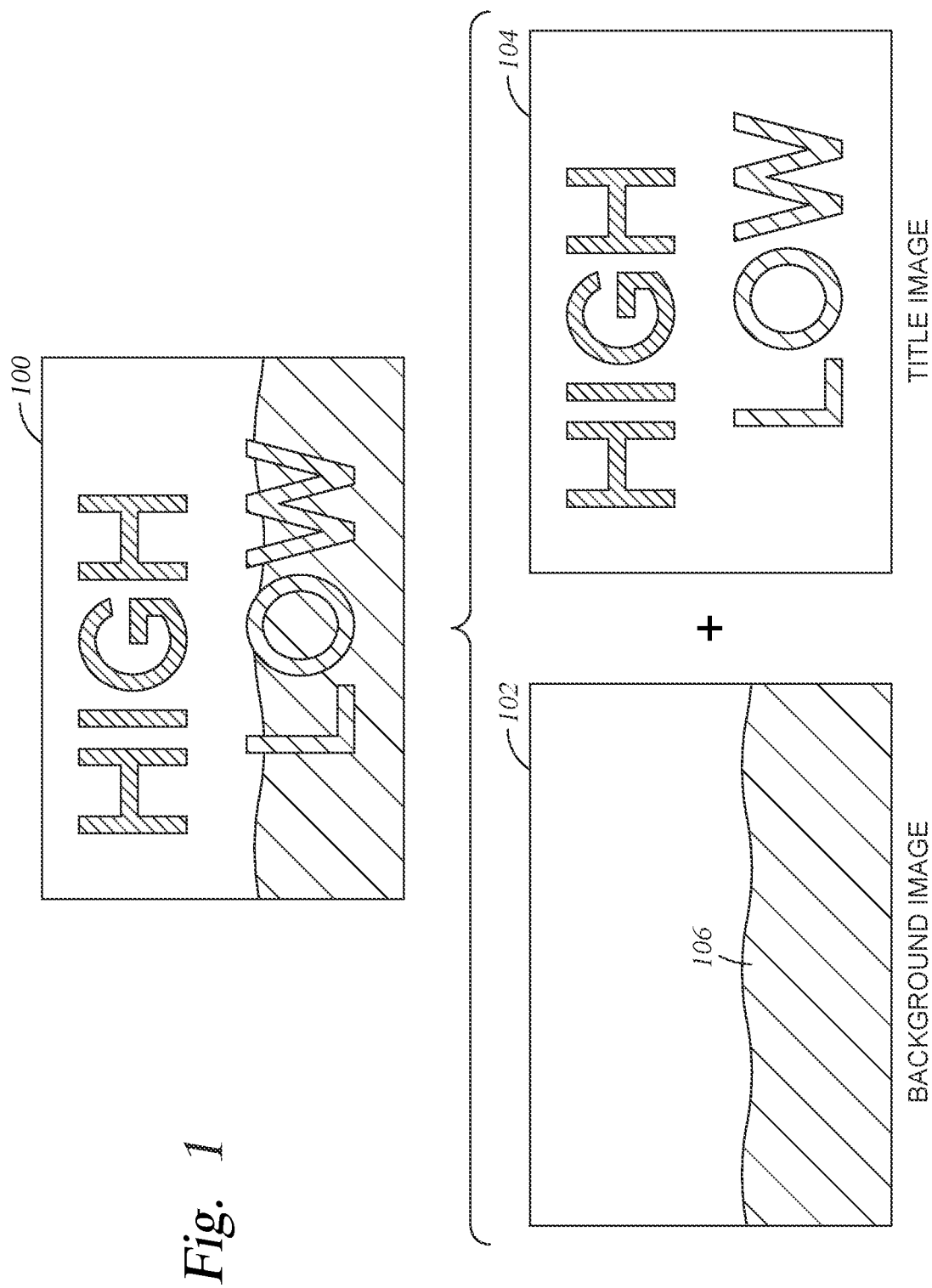
FIG. 1 illustrates an example image and component images.

FIG. 1 illustrates an example image 100. As seen in FIG. 1, the image 100 is formed using two component images, a background image 102 and a title image 104. The image 100 may be formed by overlaying the title image 104 onto the background image 102. The background image 102 includes a shaded region 106. The background image 102 may be any suitable displayed image or video image sequence (e.g., a still image, a website, a videogame, or a television video). The title image 104 includes the words "HIGH" and "LOW". The letters that form these words are also shaded.

When the title image 104 is overlaid onto the background image 102, the word "HIGH" is positioned outside the shaded region 106 of the background image 102. The word "LOW" however, is positioned within the shaded region 106 of the background image 102. Besides the "HIGH" and the "LOW, the remaining portion of the title image 104 is transparent so the underlying background image 106 is seen when the two images are combined. As seen in FIG. 1, due to the similar shading of the shaded region 106 and the letters of the word "LOW", it may be difficult to see or discern the word "LOW" in the image 100. Stated differently, due to the low contrast of the word "LOW" with the shaded region 106. The word "LOW" may appear to blend into the shaded region 106 in the image 100, making it difficult to see the word "LOW". The processes described herein automatically detects the low contrast regions between the background image 102 and the title image 104, and in some embodiments, corrects for the low contrast.

Figure 2:
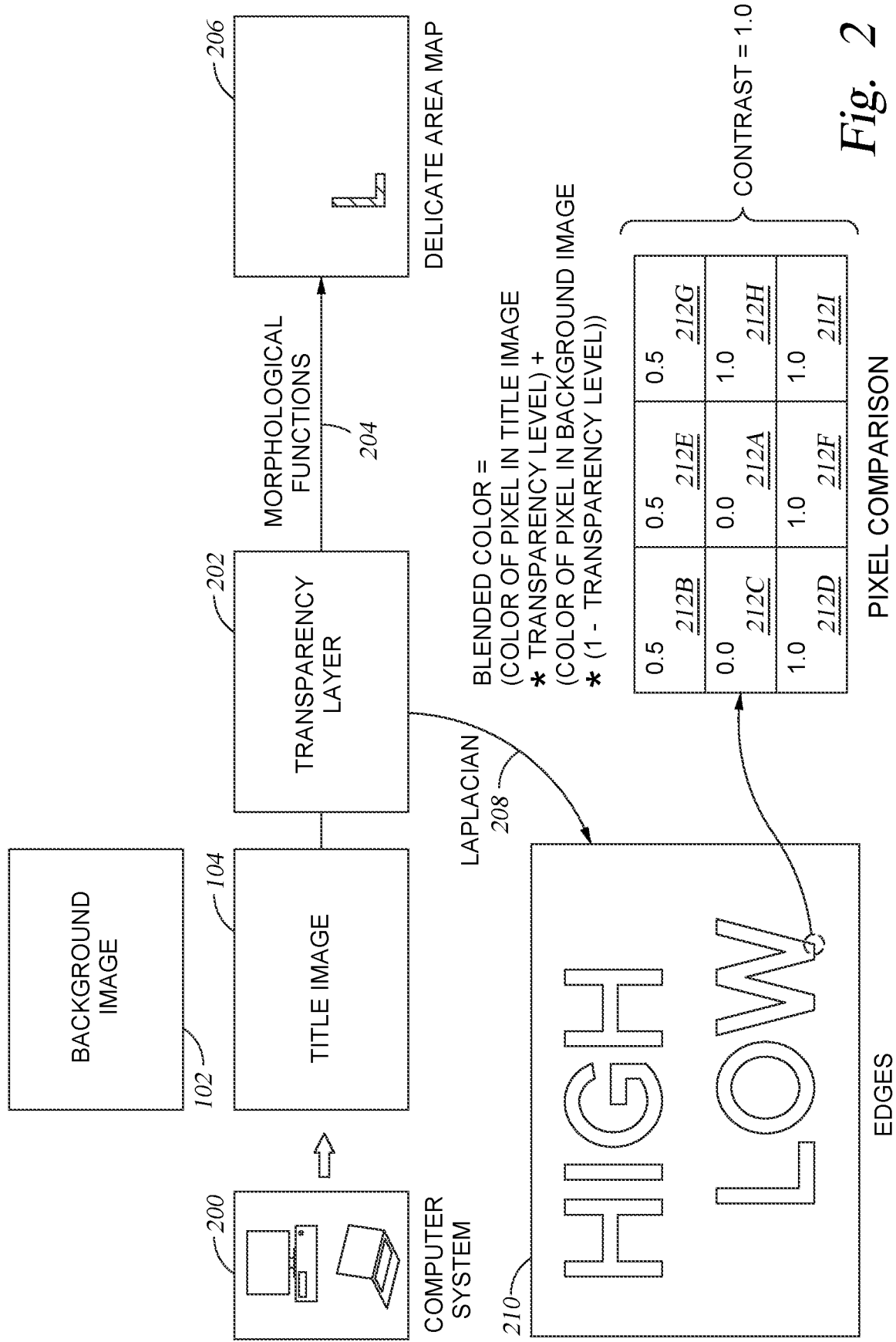
FIG. 2 illustrates an example contrast detection on the image of FIG. 1.

FIG. 2 illustrates contrast detection on the image 100 of FIG. 1. Generally, a computer system 200 determines a contrast value for pixels of detected edges of the title image 104. These contrast values may then be used to determine whether there is sufficient contrast between the title image 104 and the background image 102, and whether adjustments or corrections should be made.

The computer system 200 may include one or more computing devices, such as computers, laptops, servers, clients, tablets, or smartphones. Additional details of the computer system 200 are provided with respect to FIG. 5.

The title image 104 includes a transparency layer 202. The transparency layer 202 indicates a transparency level of each pixel of the title image 104. For example, a pixel that is more transparent may have a higher transparency level in the transparency layer 202 than a pixel that is less transparent. The computer system 200 may apply various functions to the transparency layer 202 to determine the edges and the contrast values for the title image 104.

The computer system 200 performs one or more morphological functions 204 on the transparency layer 202 to generate a delicate area map 206. For example, the computer system 200 may first perform a morphological opening on the transparency layer 202 to identify small or thin objects in the title image 104. It may be important to identify these small or thin objects, because these objects are more difficult to see in low contrast relative to larger objects. In the example of FIG. 2, the letter in the word "LOW" is identified after performing the morphological opening because the has smaller or thinner sections relative to the other letters in the title image 104. In some embodiments, the morphological opening removes the small or thin objects from the title image 104. In these embodiments, these removed objects are identified and used to generate the delicate area map 206.

As another example, the computer system 200 may perform a morphological dilation on the small or thin objects identified through the morphological opening prior to generating the delicate area map 206. The morphological dilation makes the small or thin objects more visible and fills in small holes in these objects (e.g., loss of pixel information caused by the morphological opening). For example, the morphological dilation may add pixels to the boundaries of the letter that were lost during the morphological opening, which expands the edges of the letter. As a result of this operation, small elements in the delicate area map may become more salient and analysis on the small or thin objects may be more accurate.

The delicate area map 206 includes the small or thin objects identified through the morphological opening. Additionally, these small or thin objects may have been made more visible through the morphological dilation. In the example of FIG. 2, the delicate area map 206 includes the letter "L" from the word "low" thereby indicating that the letter "L" is a delicate area that may be more sensitive to low contrast. Stated differently, the delicate area map 206 includes the regions of the title image 104 that may be thin or small enough such that low contrast in these regions causes these regions to be difficult to discern. The regions in the delicate area map 206 are used later to determine whether there is sufficient contrast in the image 100.

The computer system 200 then performs a boundary detection function, such as a Laplacian 208, on the transparency layer 202 to identify one or more edges 210 in the title image 104. The edges 210 may form the boundaries of objects within the title image 104. In the example of FIG. 2, the edges 210 form the boundaries for the letters of the words "HIGH" and "LOW" in the title image 104. The computer system 200 then determines contrast values for the pixels that form the edges 210. These contrast values are significant in determining the low contrast regions between the background image 102 and the title image 104 because the pixels of the edges 210 primarily contribute to the visibility of the objects in the title image 104, especially when overlaid onto the background image 106.

Generally, the computer system 200 determines the contrast values for the pixels that form the edges 210 by first determining a blended color for the pixels that form the edges 210 and for the pixels that surround the pixels that form the edges 210. Generally, the blended color for a pixel is a sum of (1) a product of a color of the pixel in the title image 104 and the transparency level of the pixel from the transparency layer 202 and (2) a product of a color of the pixel in the background image 102 and the complement of the transparency level of the pixel from the transparency layer 202. For example, if the transparency level of a pixel is a value from 0 to 1, then the complement of the transparency level is equal to 1− the transparency level, and the formula for the blended color is:

Blended color=(color of pixel in the title image*transparency level)+(color of pixel in the background image*(1−transparency level))

The blended color for a pixel represents the appearance of that pixel when the title image 104 is overlaid onto the background image 102 to form the image 100.

After the blended colors for the pixels are determined, the computer system 200 determines contrast values for the pixels that form the edges 210. Generally, the computer system 200 determines the contrast value for a pixel by comparing the blended color for that pixel with the blended colors of the pixels surrounding that pixel. Each comparison with a surrounding pixel produces a contrast value 212 that indicates the contrast between the two pixels. After the comparisons for a pixel are performed, the computer system 200 assigns the maximum contrast value from the comparisons as the contrast value for the pixel. Any suitable process for determining the contrast value may be used. For example, a Web Content Accessibility Guidelines (WCAG) process for determining contrast may be used.

In the example of FIG. 2, the computer system 200 determines a contrast value for a pixel on the boundary of the letter 'W.' First, the computer system 200 compares the blended color of that pixel with the blended colors of its surrounding pixels. Each of these comparisons generates a contrast value 212, with a higher value generally indicating a higher contrast between the two pixels. As seen in FIG. 2, the comparison of the pixel with its surrounding pixels in the title image 104 generates contrast values 212A, 212B, 212C, 212D, 212E, 212F, 212G, 212H, and 212I. The contrast value 212A is 0, indicating that there is no difference in color between the pixel and itself. The contrast value 212B indicates a contrast between the pixel and its neighbor to the top left. In the example of FIG. 2, the contrast value 212B is 0.5. The contrast value 212C indicates the contrast between the pixel and its left neighbor. In the example of FIG. 2, the contrast value 212C is 0. The contrast value 212D indicates the contrast between the pixel and its bottom left neighbor. In the example of FIG. 2, contrast value 212D is 1. The contrast value 212E indicates the contrast between the pixel and its top neighbor. In the example of FIG. 2, the contrast value 212E is 0.5. The contrast value 212F indicates the contrast between the pixel and its bottom neighbor. In the example of FIG. 2, the contrast value 212F is 1. The contrast value 212G is the contrast value between the pixel and its top right neighbor. In the example of FIG. 2, the contrast value 212G is 0.5. The contrast value 212H is the contrast value between the pixel and its right neighbor. In the example of FIG. 2, the contrast value 212H is 1. The contrast value 212I is the contrast value between the pixel and its bottom right neighbor. In the example of FIG. 2, the contrast value 212I is 1.

After the contrast values 212 are determined, a contrast value is assigned for the pixel. Generally, the computer system 200 assigns the maximum contrast value determined through the comparisons with neighboring pixels as the contrast value for the pixel. In the example of FIG. 2, the maximum contrast value determined for the pixel is 1. As a result, the contrast value assigned to the pixel is 1. This process is repeated to determine a contrast value for each pixel of the edges 210.

Figure 3:
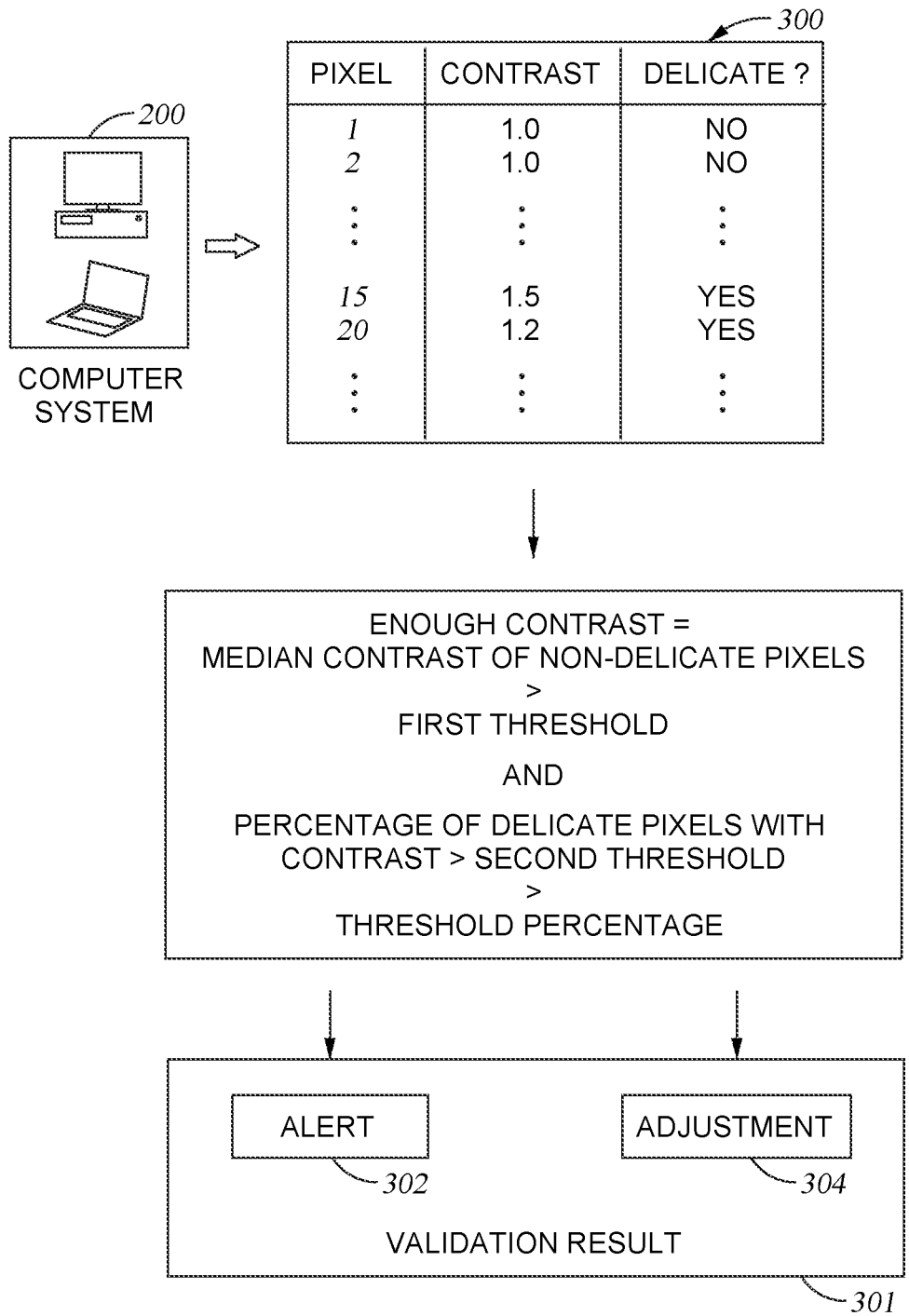
FIG. 3 illustrates an example contrast detection on the image of FIG. 1.

FIG. 3 illustrates an example contrast detection on the image 100 of FIG. 1. After the contrast values for the pixels at the edges 210 are determined, the computer system 200 then determines whether the pixel is located in the delicate area map 206. In the previous example, the computer system 200 determines whether the pixel forms an edge 210 of the letter because that letter appears in the delicate area map 206. The computer system 200 logs in a table 300 the contrast value for a pixel and whether the pixel is located in the delicate area map 206. As a result, the table 300 shows the contrast value for each pixel and whether that pixel is located in the delicate area map 206. In the example of FIG. 3, the table 300 shows that pixels 1 and 2 have a contrast value of 1 and that both pixels 1 and 2 are not located in the delicate area map 206. Additionally, the table 300 shows that pixels 15 and 20 have a contrast of 1.5 and 1.2, respectively, and that both pixels 15 and 20 are located in the delicate area map 206. The table 300 thus indicates that the pixels 15 and 20 are part of the edge 210 of the letter in the word "LOW."

The computer system 200 then uses the values in the table 300 to assess whether there is sufficient contrast when the title image 104 is overlaid onto the background image 102. Generally, the computer system 200 may verify two different contrast metrics based on the values of the table 300 to determine whether there is sufficient contrast. First, the computer system 200 determines a median contrast of pixels that are not located in the delicate area map 206. If the median contrast is greater than a first threshold (e.g., 1.25), then the first check passes. Otherwise, the first check fails. Second, the computer system 200 determines the percentage of pixels located in the delicate area map 206 with a contrast value greater than a second threshold (e.g., 1.25). If this percentage exceeds a threshold percentage (e.g., 99%), then the second check passes. Otherwise, the second check fails. The first threshold, second threshold, and the threshold percentage may be set at any suitable value. In certain embodiments, the first threshold, second threshold, and the threshold percentage may change depending on the medium on which the image 100 is displayed. For example, the thresholds can be increased to increase the desired contrast when the image 100 is being projected by a projector. As another example, the threshold can be decreased to decrease the desired contrast when the image 100 is being displayed on a mobile phone.

If either the first verification or the second verification fails, then there is not sufficient contrast when the title image 104 is overlaid onto the background image 102. If both the first verification and the second verification pass, then there is sufficient contrast when the title image 104 is overlaid onto the background image 102. The computer system 200 may then generate a validation result 301 to indicate the result of the contrast verification. For example, the validation result 301 may include an alert 302 that indicates that there is not sufficient contrast. The computer system 200 may communicate the alert 302 to a user or a device of the user to notify the user of the insufficient contrast. In some embodiments, the alert 302 also indicates the regions of the background image 102 or title image 104 with insufficient contrast. For example, the computer system 200 may compare the contrasts of the pixels in the image 100 against a third threshold. The pixels that have contrast values that fall below this third threshold are identified as regions of low contrast in the image 100. The alert 302 indicates these regions of low contrast in the image 100. A user may then act on the alert 302 to increase the contrast within these regions.

In particular embodiments, the validation result 301 also includes an adjustment 304. The computer system 200 automatically performs the adjustment 304 to increase the contrast between the background image 102 and the title image 104 when there is insufficient contrast. For example, the adjustment 304 may include changing the colors of pixels in the background image 102 or the title image 104. As another example, the adjustment 304 may include changing the transparency levels of pixels in the title image 104. These pixels may be on the determined edges 210. By changing their color, the contrast between the title image 104 and the background image 102 may be increased. As another example, the adjustment 304 may include changing a typography of certain portions of the background image 102 or the title image 104 to increase the contrast between the background image 102 and the title image 104. The typography change may include changing the thickness or the size of a stroke used to draw an object in the background image 102 or the title image 104. For example, the thickness or size of the stroke of objects within the delicate area map 206 may be increased to improve the contrast of the small or thin objects.

Figure 4:
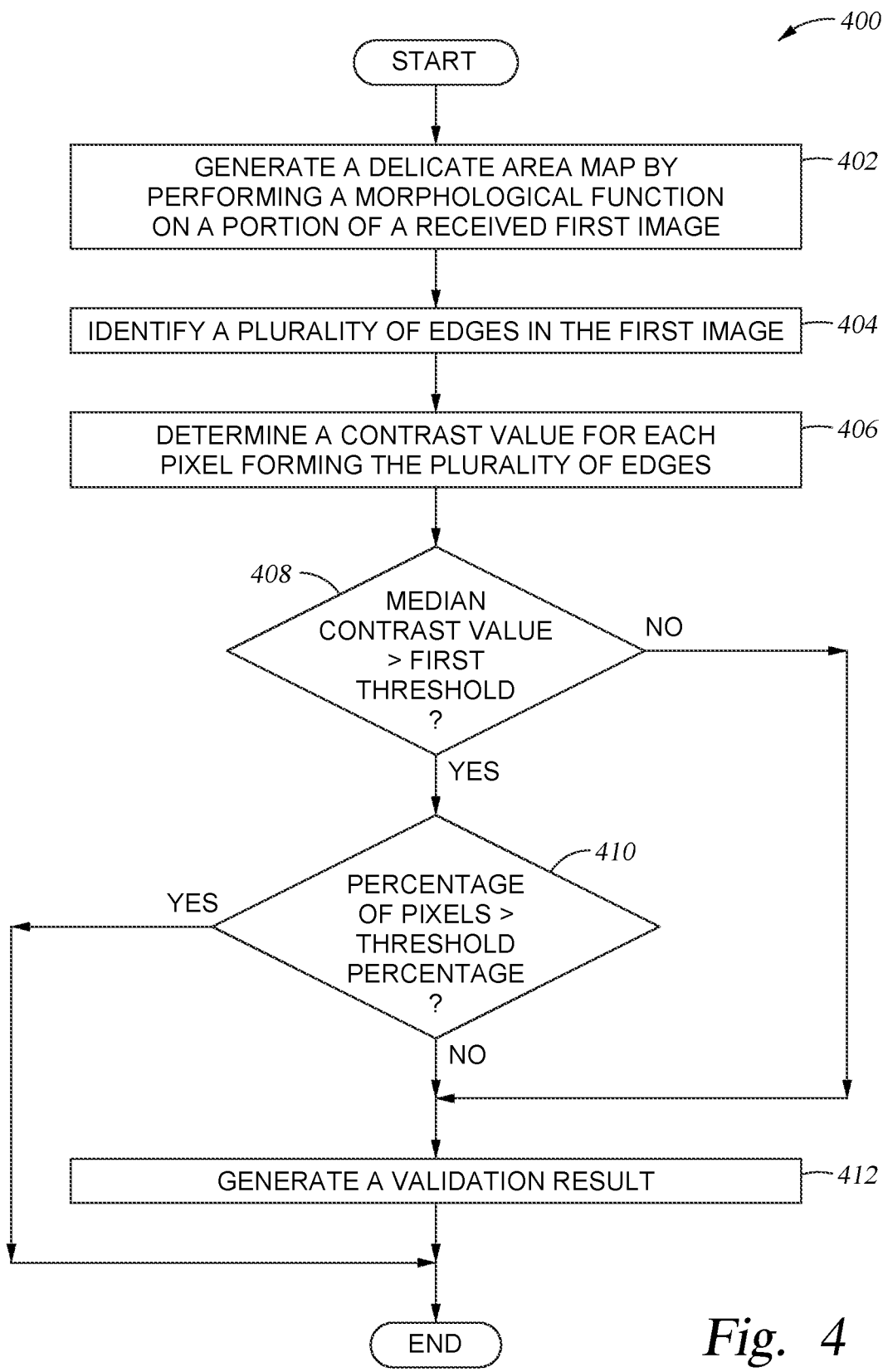
FIG. 4 is a flowchart of an example method of contrast detection.

FIG. 4 is a flowchart of an example method 400 of contrast detection. Generally, the computer system 200 may perform the steps of the method 400. In particular embodiments, by performing method 400, an image with low contrast may be automatically identified.

In step 402, the computer system 200 generates a delicate area map 206 by performing one or more morphological functions 204 on a portion of a received first image (e.g., the title image 104). In certain embodiments, the morphological function includes a morphological opening on a transparency layer 202 of the first image. The morphological opening may identify small or thin objects within the first image. The morphological function may also include a morphological dilation on the small or thin objects identified within the first image (e.g., the 'L' in the title image 104 of FIG. 1 that forms the delicate area map 206 of FIG. 2). The morphological dilation may fill in holes or make the small or thin objects easier to see.

In step 404, the computer system 200 identifies a plurality of edges 210 in the first image. The computer system 200 may identify the edges 210 by performing a boundary detection technique or function (e.g., a Laplacian 208) on the transparency layer 202 of the first image. The edges 210 may form the boundaries of objects within the first image.

In step 406, the computer system 200 determines a contrast value for each pixel forming the plurality of edges 210. The computer system 200 may determine the contrast value for a pixel by comparing a blended color of the pixel with the blended colors of its surrounding pixels. The blended color for a pixel may be a sum of (1) a product of the color of the pixel in the first image and the transparency level of the pixel and (2) a product of the color of the pixel in the second image and the complement of the transparency level of the pixel. The determined contrast value for the pixel is the maximum contrast value determined through these comparisons in certain embodiments.

In step 408, the computer system 200 performs a first check to determine whether the first image has sufficient contrast when overlaid onto the second image. A median contrast value of pixels on the edges 210 that are not in the delicate area map 206 is determined. For example, the computer system 200 may use table 300 to identify the pixels that are not located in the delicate area map 206. The computer system 200 may then identify the contrast values for these pixels and determine the median value of these contrast values. The computer system 200 then compares this median contrast value with a first threshold to determine whether this median contrast value exceeds the first threshold. If the median contrast value does not exceed the first threshold, then the computer system 200 proceeds to step 412 and generates an alert 302 indicating that there is insufficient contrast in the first image when overlaid on the second image.

If the median contrast value exceeds the first threshold, then the computer system 200 proceeds to step 410 to determine whether a percentage of pixels in the delicate area map 206 with a contrast value greater than a second threshold exceeds a threshold percentage. If the percentage of pixels does not exceed the threshold percentage, then the computer system 200 proceeds to step 412 to generate a validation result 301. The validation result 301 may include an alert 302 indicating that there is insufficient contrast when the first image is overlaid onto the second image. If the percentage of pixels exceeds the threshold percentage, then the computer system 200 concludes the method 400.

The validation result 301 may also include an adjustment 304. The computer system 200 may make the adjustment 304 to the first image or second image. The adjustment 304 may include changing a color, typography, or transparency level within the first image or second image. Using the example of FIG. 1, the adjustment 304 may include changing the cross hatching in the word "LOW" in the title image 104 to be different from the cross hatching of the shaded region 106 in the background image 102. As another example, the adjustment 304 may include increasing the size or changing the font of the letter in the word "LOW" or of the entire word "LOW" to make the or the word "LOW" more visible. As yet another example, the adjustment 304 may include decreasing a transparency level of the letter in the word "LOW."

As discussed previously, the first threshold, the second threshold, and the threshold percentage may be set at any suitable values. In some embodiments, the first threshold and the second threshold are the same value.

Figure 5:
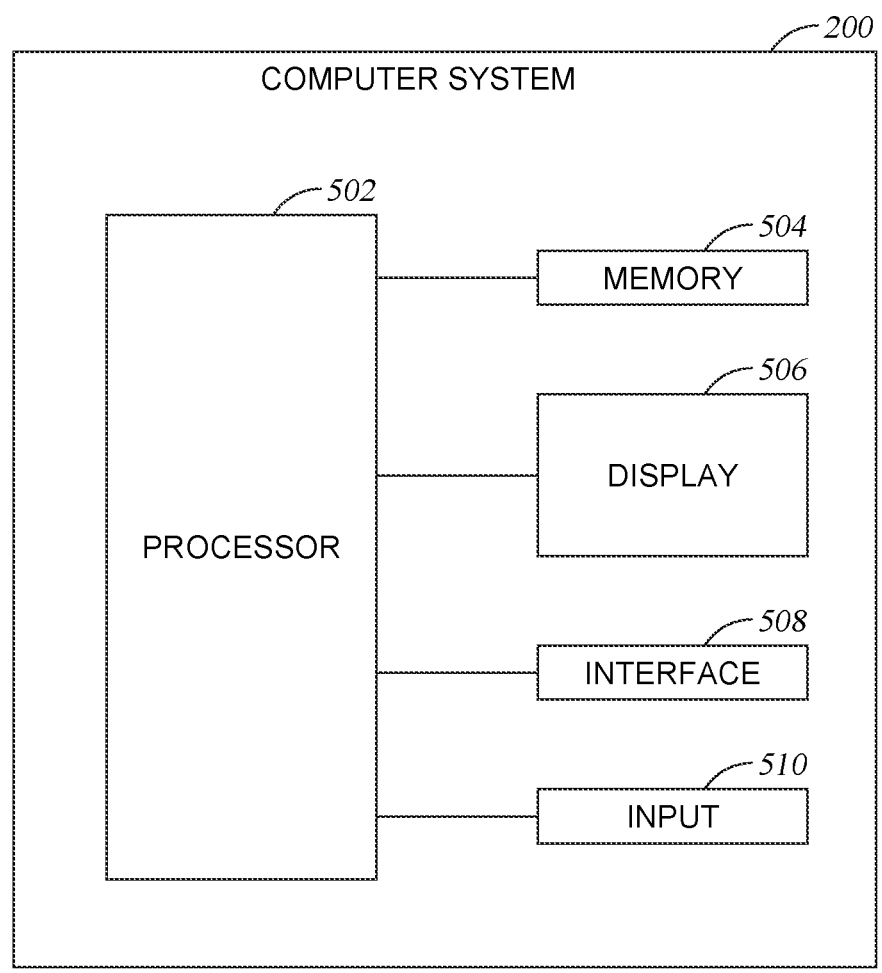
FIG. 5 illustrates an example computer system.

FIG. 5 illustrates an example computer system 200. As seen in FIG. 5, the computer system 200 includes a processor 502, a memory 504, a display 506, an interface 508, and an input 510, which may be configured to perform any of the contrast detection processes described herein. For example, the computer system 200 or its components may receive the image 100, generate the delicate area map 206, identify the edges 210, calculate the contrast values 212, generate the alert 302, and make adjustments 304.

The processor 502 is any electronic circuitry, including, but not limited to microprocessors, application specific integrated circuits (ASIC), application specific instruction set processor (ASIP), or state machines, that communicatively couples to memory 504 and controls the operation of the computer system 200. The processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 502 may include other hardware that operates software to control and process information. The processor 502 executes software stored on memory to perform any of the functions described herein. The processor 502 controls the operation and administration of the computer system 200 by processing information (e.g., information received from the memory 504, the interface 508, and the input 510). The processor 502 may be a programmable logic device, a microcontroller, a microprocessor, any suitable processing device, or any suitable combination of the preceding. The processor 502 is not limited to a single processing device and may encompass multiple processing devices.

The memory 504 may store, either permanently or temporarily, data, operational software, or other information for the processor 502. The memory 504 may include any one or a combination of volatile or non-volatile local or remote devices suitable for storing information. For example, the memory 504 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 504, a disk, a CD, or a flash drive. In particular embodiments, the software may include an application executable by the processor 502 to perform one or more of the functions described herein.

The display 506 may present visible output to a user of computer system 200. The display 506 may receive signals from the processor 502 and generate a visual image based on those signals. The display 506 may be any suitable display, such as a liquid crystal display, a cathode ray tube display, a light-emitting diodes display, or a plasma display. The display 506 may present visual information such as displaying the image 100, the background image 102, or the title image 104. The display 106 may further display visual indicators of regions of low contrast.

The interface 508 may send communications from computer system 200 to other computer systems over a network. The interface 508 may also receive communications from other computer systems over the network. For example, the processor 502 may generate communications to be sent to other computer systems by the interface 508. The interface 508 may receive responses from the other computer systems and direct these responses to the processor 502. The interface 508 may include any suitable communication equipment, such as a network interface card, a modem, or a wireless radio.

The input 510 may include any suitable device operable by a user to generate signals for the computer system 200. The input 510 may include a keyboard, a mouse, a joystick, an optical device, a touchpad, a touchscreen, a mechanical button, a mechanical lever, a microphone, a camera, etc. The user may operate the input 510 to communicate signals or instructions to the computer system 200.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   generating a delicate area map by operation of one or more computer processors and by performing a morphological function on a portion of a received first image;
   identifying a plurality of edges in the first image, the plurality of edges comprising a plurality of pixels;
   verifying that a first subset of pixels that are in the plurality of pixels but not in the delicate area map meets a threshold median contrast;
   verifying that a second subset of pixels that are in the plurality of pixels and in the delicate area map has a threshold percentage of pixels meeting a threshold contrast; and
   generating a validation result based on the verifications.

2. The method of claim 1, wherein generating the validation result comprises generating an alert in response to the threshold median contrast or the threshold percentage not being met.

3. The method of claim 2, wherein the threshold contrast comprises a first threshold contrast, wherein the alert identifies a portion of the first image for which a second threshold contrast is not met.

4. The method of claim 1, wherein generating the validation result comprises, in response to the threshold median contrast or the threshold percentage not being met, adjusting a color of a pixel in the plurality of pixels such that the threshold median contrast or the threshold percentage is met.

5. The method of claim 1, wherein generating the validation result comprises, in response to the threshold median contrast or the threshold percentage not being met, adjusting a typography in a portion of the first image such that the threshold median contrast or the threshold percentage is met.

6. The method of claim 1, wherein the first threshold median contrast is equal to the threshold contrast.

7. The method of claim 1, further comprising identifying the portion of the first image by performing a morphological opening on a transparency layer of the first image.

8. The method of claim 1, wherein the delicate area map is generated by performing a morphological dilation to the portion of the first image.

9. The method of claim 1, wherein the plurality of edges are identified by performing a Laplacian on a transparency layer of the first image.

10. A method comprising:
    generating a delicate area map by performing a morphological function on a portion of a received first image;
    identifying a plurality of edges in the first image, the plurality of edges comprising a plurality of pixels;
    verifying a first contrast metric for a first subset of pixels that are in the plurality of pixels but not in the delicate area map;
    verifying a second contrast metric for a second subset of pixels that are in the plurality of pixels and in the delicate area map;

generating a validation result based on the verifying of the first contrast metric and the verifying of the second contrast metric; and for each pixel in the plurality of pixels:
determining a blended color based on a color of that pixel, a color of a corresponding pixel in a second image, and a transparency level of that pixel; and
determining a contrast value by comparing the blended color of that pixel with blended colors of the pixels surrounding that pixel.

11. The method of claim 10, wherein the contrast value determined for a pixel in the plurality of pixels is a maximum of the contrast values determined by comparing a blended color of the pixel with blended colors of the pixels surrounding the pixel.

12. The method of claim 10, wherein the blended color for a pixel is a sum of (1) a product of a color of the pixel in the first image and a transparency level of the pixel in the first image and (2) a product of a color of a corresponding pixel in the second image and a complement of the transparency level of the pixel in the first image.

13. A system comprising:
a memory; and
a hardware processor communicatively coupled to the memory, the hardware processor configured to:
generate a delicate area map by performing a morphological function on a portion of a received first image;
identify a plurality of edges in the first image, the plurality of edges comprising a plurality of pixels;
verify that a first subset of pixels that are in the plurality of pixels but not in the delicate area map meets a threshold median contrast;
verify that a second subset of pixels that are in the plurality of pixels and in the delicate area map has a threshold percentage of pixels meeting a threshold contrast; and
generate a validation result based on the verifications.

14. The system of claim 13, the hardware processor further configured to, in response to the threshold median contrast or the threshold percentage not being met, adjust a color of a pixel in the plurality of pixels such that the threshold median contrast or the threshold percentage is met.

15. The system of claim 13, the hardware processor further configured to, in response to the threshold median contrast or the threshold percentage not being met, adjust a typography in a portion of the first image such that the threshold median contrast or the threshold percentage is met.

16. The system of claim 13, wherein the delicate area map is generated by performing a morphological dilation to the portion of the first image.

17. The system of claim 13, wherein the plurality of edges are identified by performing a Laplacian on a transparency layer of the first image.

18. A system comprising:
a memory; and
a hardware processor communicatively coupled to the memory, the hardware processor configured to:
generate a delicate area map by performing a morphological function on a portion of a received first image;
identify a plurality of edges in the first image, the plurality of edges comprising a plurality of pixels;
verify a first contrast metric for a first subset of pixels that are in the plurality of pixels but not in the delicate area map;
verify a second contrast metric for a second subset of pixels that are in the plurality of pixels and in the delicate area map;
generate a validation result based on the verifying of the first contrast metric and the verifying of the second contrast metric; and
for each pixel in the plurality of pixels:
determine a blended color based on a color of that pixel, a color of a corresponding pixel in a second image, and a transparency level of that pixel; and
determine a contrast value by comparing the blended color of that pixel with blended colors of the pixels surrounding that pixel.

19. The system of claim 18, wherein the contrast value determined for a pixel in the plurality of pixels is a maximum of the contrast values determined by comparing a blended color of the pixel with blended colors of the pixels surrounding the pixel.

20. The system of claim 18, wherein the blended color for a pixel is a sum of (1) a product of a color of the pixel in the first image and a transparency level of the pixel in the first image and (2) a product of a color of a corresponding pixel in the second image and a complement of the transparency level of the pixel in the first image.

* * * * *

UNITED STATES PATENT AND TRADEMARK OFFICE
CERTIFICATE OF CORRECTION

PATENT NO. : 11,494,944 B2
APPLICATION NO. : 16/951520
DATED : November 8, 2022
INVENTOR(S) : Miquel Angel Farré Guiu et al.

It is certified that error appears in the above-identified patent and that said Letters Patent is hereby corrected as shown below:

In the Specification

In Column 2, Line 53, delete "letter" and insert -- letter 'L' --.

In Column 2, Line 54, delete "the has" and insert -- the 'L' has --.

In Column 3, Line 1, delete "letter that" and insert -- letter 'L' that --.

In Column 4, Line 48, delete "letter" and insert -- letter 'L' --.

In Column 4, Line 60, delete "letter" and insert -- letter 'L' --.

In Column 7, Line 4, delete "letter" and insert -- letter 'L' --.

In Column 7, Line 5, delete "the or the" and insert -- the 'L' or the --.

In Column 7, Line 7, delete "letter" and insert -- letter 'L' --.

In the Claims

In Column 10, Line 45, in Claim 6, delete "first threshold" and insert -- threshold --.

Signed and Sealed this
Thirtieth Day of July, 2024

Katherine Kelly Vidal
*Director of the United States Patent and Trademark Office*